United States Patent [19]
Landers et al.

[11] Patent Number: 5,254,074
[45] Date of Patent: Oct. 19, 1993

[54] INFLATABLE PACKAGING BAG

[75] Inventors: James A. Landers, Madbury, N.H.; Gary O. Reid, Colorado Springs, Colo.; Steven J. Greenland, Stratham, N.H.

[73] Assignee: Laminated Films & Packaging, Portsmouth, N.H.

[21] Appl. No.: 791,086

[22] Filed: Nov. 12, 1991

[51] Int. Cl.⁵ .................................................. B31B 1/84
[52] U.S. Cl. ...................................... 493/213; 493/224; 493/929
[58] Field of Search ............... 493/210, 211, 212, 214, 493/213, 220, 224, 328, 923, 929, 967; 410/119

[56] References Cited
U.S. PATENT DOCUMENTS

| | | | |
|---|---|---|---|
| 3,279,330 | 10/1966 | Harding | 493/211 |
| 3,472,130 | 10/1969 | Brockmuller | 493/220 |
| 4,708,705 | 11/1987 | Aubry | 493/213 |

Primary Examiner—Bruce M. Kisliuk
Assistant Examiner—Jack Lavinder
Attorney, Agent, or Firm—Hardaway Law Firm

[57] ABSTRACT

A novel process provides an inflatable bag for filling the void and particularly head space of partially filled boxes, the bag comprising an air chamber therein and manufactured from a single sheet of linear, low density polyethylene folded and heat sealed with a first end seam, a second end seam, and an upper end seam, and the bag including a check valve traversing the upper seam, the valve in communication at one valve terminus with the air chamber and in communication with the exterior of the bag at a second valve terminus.

1 Claim, 3 Drawing Sheets

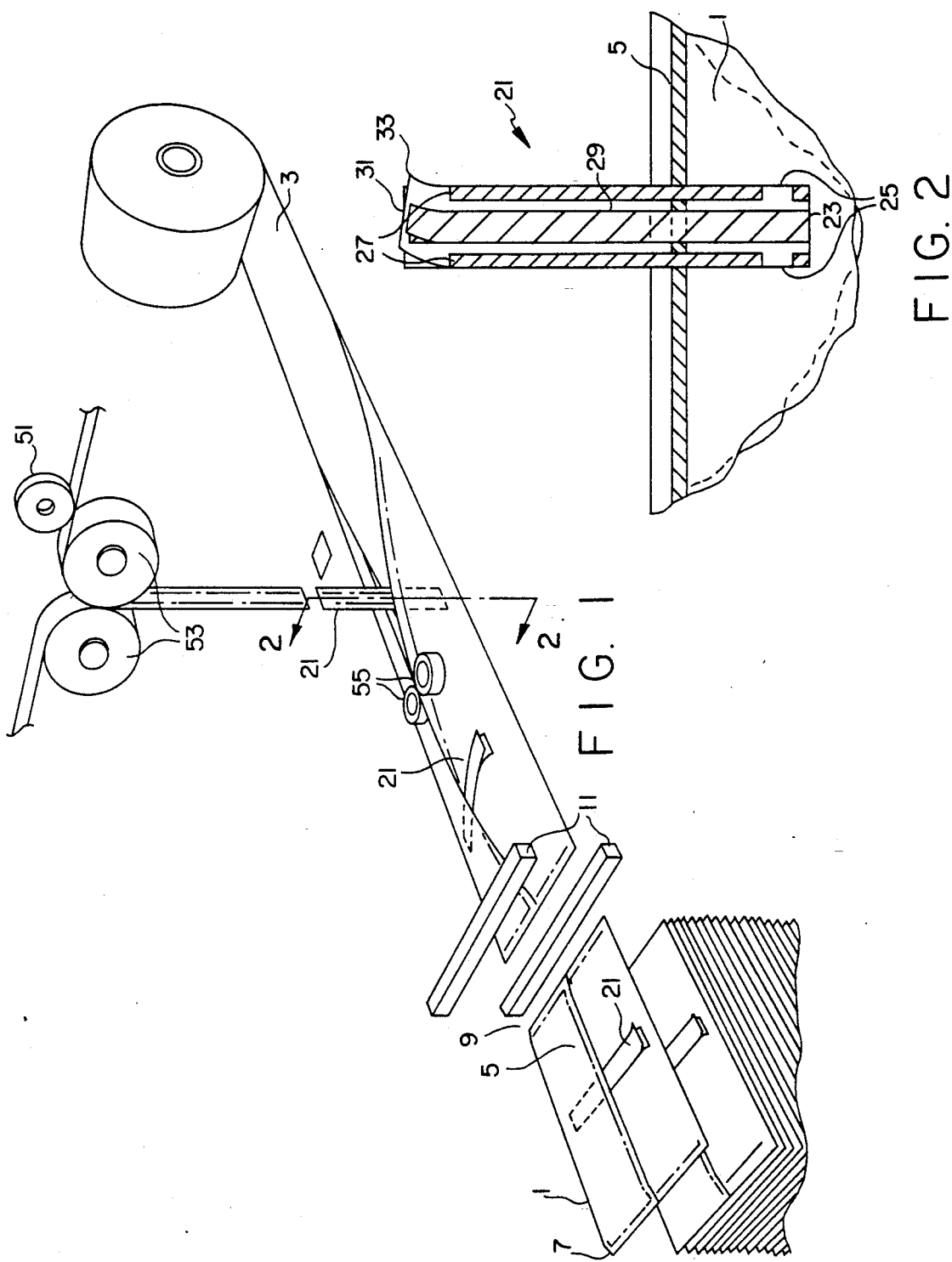

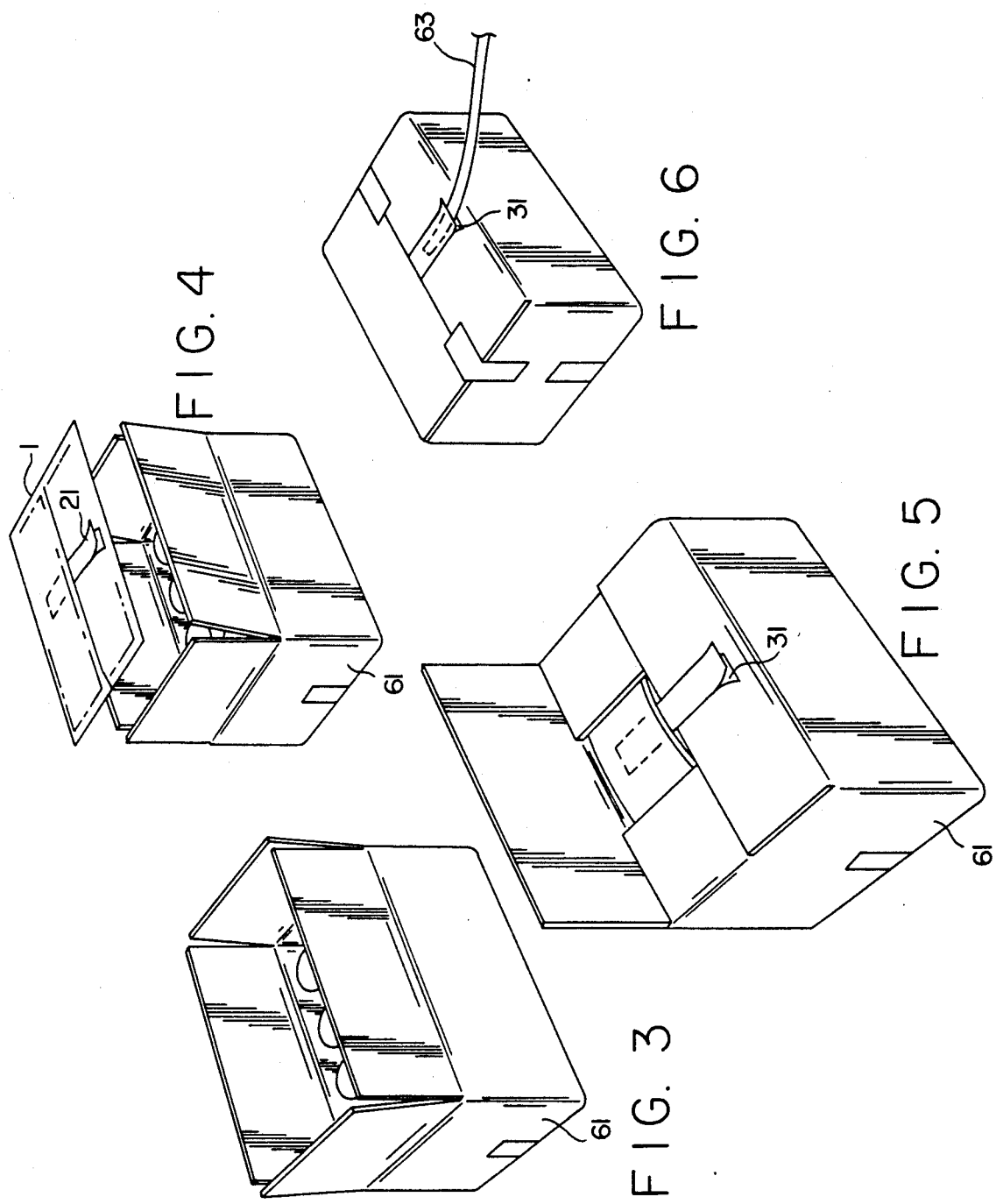

INFLATABLE PACKAGING BAG

BACKGROUND OF THE INVENTION

The present invention relates generally to the art of packaging material for use in shipping boxes. More particularly, the invention is directed to a reusable inflatable bag which can be inflated after a shipping box has been sealed.

DESCRIPTION OF PRIOR ART

A variety of inflatable packaging material is available for use in shipping boxed merchandise. U.S. Pat. No. 4,918,904 to Pharo teaches an inflatable pocket having several air chambers which are designed to envelope and protect articles contained within the pocket. U.S. Patent No. 4,793,123 to Pharo teaches a rolled up spiral bag and pouch combination which can be used to wrap an object. Pressurized air can be used to inflate a valve which may be external to the shipping box. In addition, sheetlike fabrics having numerous air filled cells are often used to protect items in transit.

However, these packaging materials require that individual objects be hand wrapped. For many applications, manual wrapping of merchandise is not cost effective in terms of either the labor required or the volume of material used. In addition, the financial, social and environmental cost of using such material is coming under increasing scrutiny. The material found in the prior art are not easily reused by the recipient. Their inflated air chambers make them difficult to store. In addition, they are not easily recyclable since they are often comprised of several different components or contain adhesives which make recycling difficult. Thus, there is a need for a packaging material which does not require items to be individually wrapped, is reusable by the recipient and, when needed, can be easily recycled. It is thus seen that there is room for variation and improvement within the art.

SUMMARY OF THE INVENTION

It is an object of this invention to provide an inflatable packaging bag which fills the void and particularly head space of partially filled boxes.

It is a further object of this invention to provide an inflatable bag which is reusable by the recipient.

It is a further and more particular object of this invention to provide a novel valve for use with an inflatable packaging bag.

It is a further and more particular object of this invention to provide an inflatable packaging bag manufactured entirely of a single compound, furthering the recyclability of such bags.

It is still a further and more particular object of this invention to provide a inflatable packaging bag which is easily manufactured.

These as well as other objects of the invention are provided by an inflatable bag defining an air chamber therein, manufactured from a single sheet of linear, low density polyethylene folded and heat-sealed with a first end seam, a second end seam and an upper seam, a check valve traversing the upper seam and in communication at one valve terminus with the air chamber and having a second terminus in communication with the exterior of the packaging bag.

BRIEF DESCRIPTION OF THE DRAWINGS

FIG. 1 of the drawings is a conceptual view of the manufacturing and assembly steps of the packaging bag.

FIG. 2 of the drawings is a perspective view of the assembled check valve seen in relation to the packaging bag.

FIGS. 3 through 6 of the drawings show a method of using the packaging bag to fill the void and head space of boxes.

DETAILED DESCRIPTION

Figure 7:
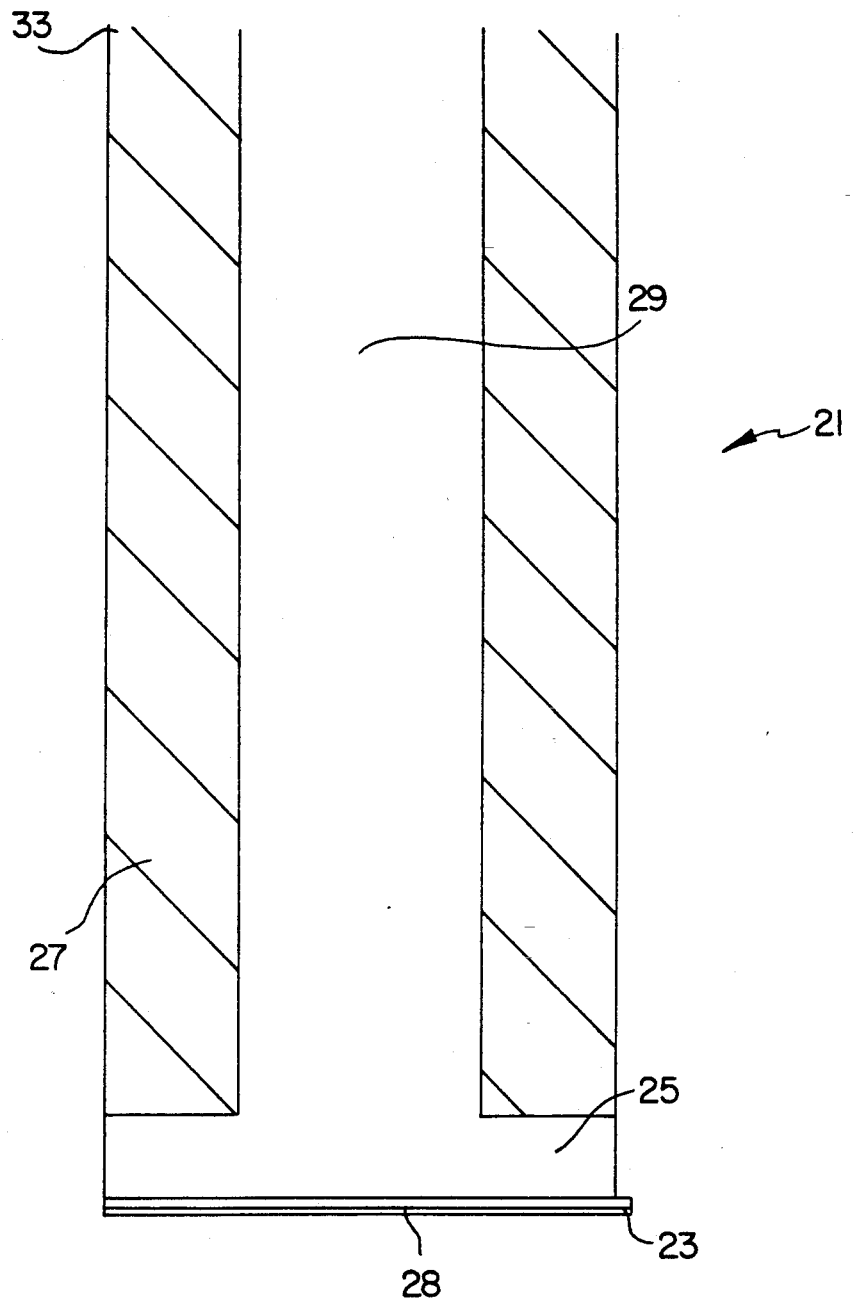
FIG. 7 is a perspective view of an additional embodiment of the check valve.

According to this invention, it has been found that a versatile, inflatable dunnage bag can be provided which offers an improved method and apparatus for filling the void and particularly head space of packaging boxes. The inflatable bag provides a novel valve and valve placement which permits the bag to be inflated after the packaging box has been sealed. Further, the entire bag is easily stored and reused by the recipient. In addition, the entire bag, including the valve assembly and seams, is constructed of a single recyclable plastic having no foreign material to interfere with recycling.

With reference to FIG. 1, the dunnage bag 1 can be formed from a single sheet 3 of linear, low density polyethylene film which is folded over an inserted valve 21 and then heat sealed forming an upper seam 5 traversed by a check valve 21. A first 7 and a second 9 end seam is formed by heat sealing cutting bars 11, completing the hematic seal of bag 1. While other materials would suffice, linear low density polyethylene film has been found to have superior strength and resistance to punctures, easily fashioned into bags, maintains pressure once inflated and is easily recycled to low density polyethylene.

In FIG. 2, the check valve assembly 21 is seen in greater detail as viewed from the direction of line 2—2 of FIG. 1. Valve 21 traverses upper seam 5 with a first terminus 23 defining an exhaust port 25 in communication with the interior of bag Exhaust port 25 is in communication with an air conduit 29 which runs the length of valve 21 and communicates with an inflation port 31 at a second valve terminus 33 at the exterior of bag 1.

Valve 21 is formed by two layers of film, preferably of linear, low density polyethylene, as best seen in FIG. 1. During manufacturing, an interior surface of one layer of the valve film has median strip of heat resistant coating applied by coating wheel 51. The coating supplied by wheel 51 allows the air chamber 29 to remain unsealed as upper seam 5 and inserted valve 21 pass through the heat sealing wheel 55. This permits the tight seal of seam 5 containing valve 21, without the undesired sealing of air conduit 29.

A pair of patterned heat sealed wheels 53 form heat sealed margins 27 leaving one or more unsealed flaps which define exhaust port 25. Terminus 33 preferably has unsealed edges along-side inflation port 31 to permit the easy insertion of an inflation hose.

An air hose can be inserted into inflation port 31, forcing air through air conduit 29 and exiting ports 25, thereby inflating bag 1. As the pressure in bag exceeds one atmosphere, valve 21 will self-seal after inflation is complete. The pressure differential between the bag's interior and exterior compresses conduit 29 as well as the unsealed valve edges which define port 25, providing a reversible hematic seal.

The size, placement, number and design of ports 25 can be varied according to the valve film thickness and the desired rate of inflation. A different embodiment of valve 21 is seen in FIG. 7. In this embodiment, the outer edge of terminus 23 is also heat sealed, providing a pair of exhaust ports 25. The heat sealing edge 28 along terminus 23 helps the unsealed valve portions defining ports 25 to firmly collapse following inflation, thereby providing a tight seal of valve 21.

As seen in FIGS. 3 through 6, a packaging box can be filled with a variety of items. Prior to sealing the box, an uninflated bag 1 is inserted into the void and particularly head space of the box, the upper seam 5 and valve 21 facing upwards. The box flaps are closed and sealed, the inflation port 31 being accessible to the exterior of the box 61 through a gap of the closed box flap. Once the flaps are secured, air hose 63 can then be inserted into inflation port 31 and used to inflate bag 1. Following removal of air hose 63, the pressure within inflated bag 1 seals valve 2 allowing inflated bag to secure the contents of box 61 for shipment.

An advantage of this arrangement is that the bag can be inflated after the box is closed. The self sealing valve does not require any type of manual closure or sealing. Bags can easily be supplied which match the precise dimensions of standard shipping boxes, thereby providing tight and secure packaging of the contents.

The uninflated bags are very compact which offer storage and handling advantages over preinflated packaging material. Further, unlike inflatable bags found within the prior art, valve 21 is self sealing thereby eliminating steps of manual closure or of heat sealing the valve following inflation. The bags are reusable by the recipient and are easily deflated by insertion of a straw or similar narrow object through the air conduit 29 of valve 21 thereby opening port 25. Once deflated, the bags can be compactly stored until needed. The bag's ability to be easily and compactly stored make it more likely that these bags will be reused by the recipient rather than disposed of.

Further, the bags are readily recyclable to low density polyethylene. Since all the components are of polyethylene, there are no adhesives, foreign valve parts or other foreign matter to interfere with the recycling process Any residue which remains from the heat protective coating applied to valve 21 is easily refined away during the recycling process.

It is thus seen that the present invention provides a useful and novel packaging apparatus with a self sealing valve which can be used to inflate the packaging bag from the exterior of a sealed box. Further, the bag can be deflated and reused numerous times and is compact to store. It is also constructed of a single recyclable compound. As various other advantages and features will become apparent to those of skill in the art from a reading of the foregoing description which is exemplary in nature, such variations are included within the spirit and scope of the invention as defined by the following appended claims.

That which is claimed:

1. A method of manufacturing inflatable dunnage bags comprising:
   providing a web of heat sealable plastic film having a first free end, a first margin and a second margin;
   juxtaposing said first and said second margins to form a tube;
   heat sealing said free end in a hermetic fashion;
   inserting a self-sealing valve between said first and said second margins;
   heat sealing said first margin to said second margin, thereby forming a hermetically sealed upper seam traversed by said valve;
   folding said seam upon a face portion of said web to form a fold;
   cutting said plastic film at second end;
   heat sealing said second end across said fold in a hermetic fashion to form one of said dunnage bags;
   repeating the above steps.

* * * * *